(No Model.)
E. HOOVER.
ANIMAL TRAP.
No. 546,886. Patented Sept. 24, 1895.
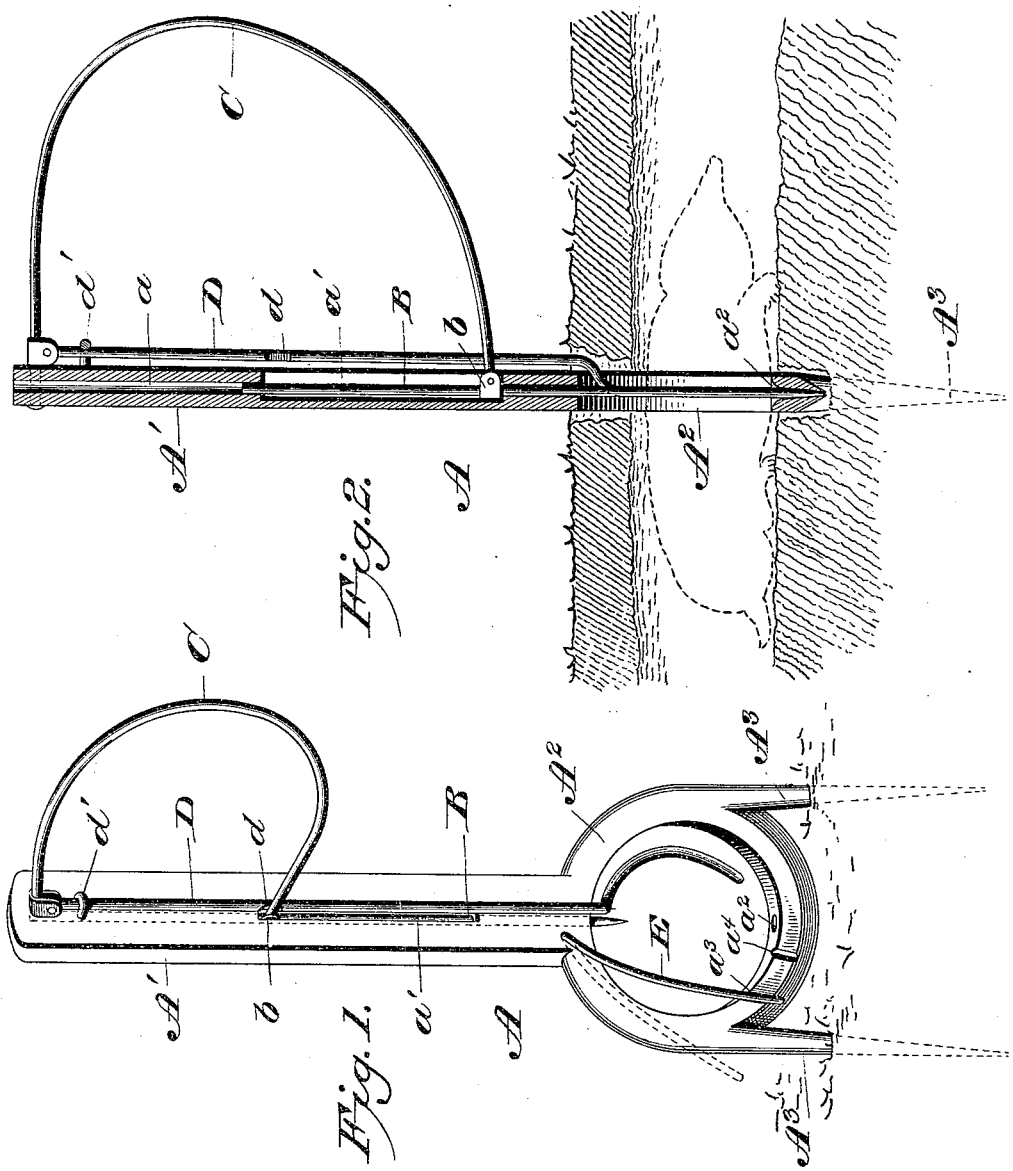
Edward Hoover
INVENTOR
WITNESSES
L. S. Elliott,
E. W. Johnson
by [signature]
Attorney

UNITED STATES PATENT OFFICE.

EDWARD HOOVER, OF NEMAHA CITY, NEBRASKA.

ANIMAL-TRAP.

SPECIFICATION forming part of Letters Patent No. 546,886, dated September 24, 1895.

Application filed July 5, 1895. Serial No. 555,030. (No model.)

*To all whom it may concern:*

Be it known that I, EDWARD HOOVER, a citizen of the United States of America, residing at Nemaha City, in the county of Nemaha and State of Nebraska, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a simple, cheap, and effective animal-trap; and it consists in the construction and combination of the parts, as will be hereinafter fully set forth, and particularly pointed out in the claims.

In the accompanying drawings, forming part of this specification, Figure 1 is a perspective view of a trap constructed in accordance with my invention, and Fig. 2 is a vertical sectional view.

A designates the frame of the trap, which is preferably made of a single piece or casting and comprises an upper straight portion $A'$, at the lower end of which is a ring $A^2$, having prongs or tines $A^3$, depending from the sides thereof. The upper part $A'$ of the frame is provided with a longitudinal aperture $a$, which is intersected by a slot or opening $a'$, extending through one side of the frame, and within the aperture $a$ the impaling rod or spear B of the trap is located, being connected to a spring-bar C by means of a collar $b$, which is rigidly secured to the rod or spear, so as to extend into the slot $a'$. The other end of the spring-bar C is secured to the upper end of the frame A by passing through a perforation therein, the end being upset or riveted. The tendency of the spring forces the impaling rod or spear downward, so that the pointed end thereof will extend through the ring $A^2$ and lie in an aperture $a^2$ in the lower end of said ring, the rod or spear being limited in its downward movement by the collar $b$, striking the wall at the lower end of the slot $a'$ in the frame A, as shown in Fig. 2. The spring-bar C is held retracted, so as to hold the impaling rod or spear B in a raised position or set, as shown in Fig. 1, by means of a trip-bar D, which is suspended from the upper end of the spring-bar and is provided with a notch $d$, with which the lower end of the spring-bar engages, the trip-bar being held in proper position by means of a staple $d'$, attached to the frame A. The trip-bar extends down to the ring $A^2$, the lower end of the same being bent into the opening in the ring and further bent or curved to correspond with the inner side of the ring, and when the device is set, as shown in Fig. 1, the curved portion of the bar will be located a slight distance from the side of the ring, so that an animal in crowding through the ring will push the lower end of the bar D to one side, which will cause it to disengage the spring, so that the latter will force the impaling rod or spear downward through the ring.

In order that the trap may be used for impaling animals of different sizes, I attach to the side of the ring $A^2$ opposite the lower end of the trip-bar a slightly-curved bar E, which is adapted to increase or diminish the size of the opening in the ring by engaging with notches $a^3$ and $a^4$ in the lower part of the ring.

Having thus described my invention, I do not wish to be limited to the precise construction and organization of the parts as herein set forth or as illustrated in the drawings, as the configuration and connection of the parts may be varied within the spirit and scope of my claims.

In operation, when it is desired to set the trap for moles or other burrowing animals the prongs $A^3$ and ring $A^2$ of the frame are forced into the ground, as shown in Fig. 2, so that the opening in the ring will intersect the hole or burrow made by the animal, the lower end of the spring C being drawn up to engage the notch $d$ in the trip-bar D, and when in this position the animal in trying to pass through the ring will push the lower end of the trip-bar to one side, releasing the spring, so that it will force the impaling rod or spear through the body of the animal. In catching smaller animals, such as rats and mice, the curved bar E is turned to engage either one of the recesses $a^3$ $a^4$, and as these rodents usually burrow through the lower part of a washboard or a door the prongs $A^3$ of the device may be driven into the floor, so as to position the opening in the ring on a line with the hole or burrow.

Having thus described my invention, what I claim as new, and desire to secure by Letters Patent, is—

1. In an impalement trap, the combination, of a frame having an extended portion with a longitudinal bore to receive a spring-actuated impaling rod, a ring or open frame having an opening $a^2$ therein into which the end of the impaling rod passes, and a trigger the lower end of which lies within the ring or open frame, substantially as shown and for the purpose set forth.

2. In an impalement trap, the combination, of a frame A having an opening and an extended portion provided with a longitudinal bore, an impaling rod or spear located within the longitudinal bore, a bowed spring attached to the spear and to the frame, and a trip-bar supported by the frame so that the free end thereof will lie within the opening, said trip-bar having a notch with which the bowed spring engages when the spear is retracted, together with a curved bar attached to the frame and adapted to engage with notches $a^3$ and $a^4$ so as to diminish the size of the opening in the frame, substantially as shown and for the purpose set forth.

3. In an impalement trap, the combination, of a frame A comprising a straight portion A', ring $A^2$ and prongs or tines $A^3$ extending from the ring, the straight portion of the frame having a longitudinal bore, an impaling rod or spear located within the longitudinal bore so as to be adapted to project across the ring, a bowed spring attached to the spear and to the upper part of the frame, a trip-bar suspended from the upper part of the spring so that the free end thereof will lie within the ring, said bar having a notch with which the bowed spring engages, and a curved bar E pivoted to the ring on the side opposite the free end of the trip-bar, said bar E being adapted to engage with notches $a^3$ and $a^4$ in the ring so as to diminish the size of the opening therein, substantially as shown and for the purpose set forth.

In testimony whereof I affix my signature in presence of two witnesses.

EDWARD HOOVER.

Witnesses:
G. W. FAIRBROTHER, Sr.,
FRANK HULBURD.